United States Patent [19]

Fickelscher

[11] 4,434,682
[45] Mar. 6, 1984

[54] PLANETARY GEAR

[75] Inventor: Kurt G. Fickelscher, Frankenthal, Fed. Rep. of Germany

[73] Assignee: Balcke-Duerr AG, Fed. Rep. of Germany

[21] Appl. No.: 299,124

[22] Filed: Sep. 3, 1981

[30] Foreign Application Priority Data

Sep. 11, 1980 [DE] Fed. Rep. of Germany ....... 3034133

[51] Int. Cl.³ .......................... F16H 1/28; F16H 55/14
[52] U.S. Cl. ........................................ 74/805; 74/640; 74/461
[58] Field of Search ................. 74/640, 803, 804, 805; 74/460, 461

[56] References Cited

U.S. PATENT DOCUMENTS

| | | | |
|---|---|---|---|
| 1,591,794 | 7/1926 | Stevens | 74/410 |
| 1,744,576 | 1/1930 | Rhett | 74/461 |
| 3,214,999 | 11/1965 | Lapp | 74/805 |
| 4,099,427 | 7/1978 | Fickelscher | 74/804 |
| 4,194,415 | 3/1980 | Kennington et al. | 74/805 |

FOREIGN PATENT DOCUMENTS

| | | |
|---|---|---|
| 1650714 | 7/1970 | Fed. Rep. of Germany ........ 74/640 |
| 2545681 | 8/1977 | Fed. Rep. of Germany . |
| 2617951 | 6/1978 | Fed. Rep. of Germany . |
| 3034133 | 12/1982 | Fed. Rep. of Germany . |
| 128028 | 10/1977 | German Democratic Rep. . |
| 194499 | 3/1967 | U.S.S.R. ................................. 74/640 |

Primary Examiner—Allan D. Herrmann
Assistant Examiner—D. Wright
Attorney, Agent, or Firm—McGlew and Tuttle

[57] ABSTRACT

The invention relates to a planetary gear having two adjacent identical central wheels of different pitch and a planet wheel whose pitch is equal to that of a virtual tooth row formed by the central wheel teeth. The teeth of the planet wheel extend into the tooth gaps between the virtual tooth rows. The planet wheel is guided and driven by a rotary disk. At least two of the three wheels have pivotable teeth. The teeth of both the central wheels and the planet wheel are of substantially triangular cross section with plane tooth profiles. It is a main objective of the invention to provide a planetary gear permitting the flank angles of the virtual tooth gaps to be adapted to the profile angle of the planet wheel teeth, in particular, in order to transmit large torques and/or also in order to achieve low speed ratios. According to the invention, the pivotable teeth of at least one central wheel are arranged on journals.

14 Claims, 6 Drawing Figures

PLANETARY GEAR

FIELD OF THE INVENTION

The invention relates to a planetary gear having two adjacent identical central wheels of different pitch and a planet wheel whose pitch is equal to that of a virtual tooth row formed by the central wheel teeth and whose teeth extend into the tooth gaps between the virtual tooth rows, the planet wheel being arranged for guided slaving by a rotary disk, at least two of said three wheels (the two central wheels and the planet wheel) having pivotable teeth, the teeth of both the central wheels and the planet wheel being of substantially triangular cross section with plane tooth profiles.

BACKGROUND OF THE INVENTION

In U.S. Pat. No. 4,099,427, there is disclosed a planetary gear with central wheels the plane tooth flanks of which mutually form virtual tooth gaps of substantially triangular shape. The teeth of a planet wheel being engaged in these virtual tooth gaps, they are in mesh with them across a large portion of the circumference, in the extreme throughout almost all of it. However, as the flank angles of the virtual tooth gaps are continuously varying across the circumference of the planetary gear, there is no warranty for positive face-to-face engagement across the entire circumference of the planet gear between (a) the tooth flanks of the plant wheel on the one hand and (b) the tooth flanks of the central wheels in the virtual tooth gaps on the other hand.

In order to overcome this problem, is has been proposed to design the teeth planet wheel such that the angles formed by their flanks are variable. In one type with identical central wheels having internal toothing, this is effected by making the corresponding external toothing of the planet wheel of zigzag-shaped sheet metal. In another type with the central wheels having external toothing, the planet wheel comprises individual teeth whose profile angles are variable under compliance so that the individual teeth adapt to the variable flank angles of the virtual tooth gaps. It has also been suggested to make the central wheel teeth pivotable to some extent by providing each of the central wheels with elongated recesses so that the foot of each tooth is connected to the central wheel body by a slender web that forms a joint which permits slight pivoting of the respective central wheel tooth.

By variation of the flank angles of the teeth of the planet wheel and/or of the central wheels, the gear types mentioned have thus solved the problem stated of providing for an adaptation to the varying flank angles of the virtual tooth gaps. However, problems continued to exist for two special applications:

(1) With low speed ratios from about 30 down to about 7, the variations of the flank angles of the virtual tooth gaps are so wide that the resilient tooth means of the planet wheel and/or of the central wheels as provided by the prior art have proven to be insufficient.

(2) The known resilient tooth means of the planet wheel and/or of the central wheels are less suited for the transmission of very large torques.

OBJECTS OF THE INVENTION

It is an object of the invention to improve planetary gears in a simple and economical way and in particular to provide a planetary gear type permitting adaptation of the flank angles of the virtual tooth gaps to the profile angles of the planet wheel teeth even for the special applications cited.

It is another object of the invention to provide planetary gears of a clear and cost-saving design doing away with the need for expensive machining subsequent to the manufacture proper.

A further object of the invention consists in creating a planetary gear of sturdy design allowing the transmission of very large torques via strong elements.

SUMMARY OF THE INVENTION

Basically, these objects are attained by providing in a planetary gear of the type first-mentioned hereinabove the improvement wherein the pivotable teeth of at least one of said central wheels are arranged on journals.

The planetary gear according to the invention is distinguished by a very simple and inexpensive structure. Its teeth and journals can be separately produced by large batches, and expensive machining, say of a central wheel as disclosed in U.S. Pat. No. 4,099,427, is avoided. No special gear cutting machines are required since the teeth are individually manufactured with the precision necessary and are subsequently connected to the journals to form a central wheel, e.g. by insertion into a disk. It is of importance that power is transmitted across the journals of the planetary gear according to the invention, which journals may readily be of high strength. In other words, slender webs as known from U.S. Pat. No. 4,099,427 for articulating the teeth are replaced by strong journals the solidity of which can be matched to requirements. Therefore, the planetary gear according to the invention is especially suited for the transmission of very large torques.

If only one of the two rows of teeth of the central wheels is provided with pivotable teeth, the planet wheel teeth are held by webs such that slight pivoting is possible. In this case one flank of each slightly pivoting tooth of the planet wheel engages face-to-face with the flanks of the teeth of that central wheel whose teeth are not pivotable, while the other flank of the respective planet wheel tooth presses onto the associated pivotable tooth of the other central wheel to move it into a position wherein the flank of that associated tooth, too, engages face-to-face with the corresponding flank of the respective planet wheel tooth.

In a preferred embodiment, the teeth of both central wheels are arranged on journals. Thus the slightly pivotable arrangement of the planet wheel teeth as mentioned above will no longer be required. Rather, it will do to provide for a slight circumferential displacement of the planet wheel teeth in order to allow for balancing of pitch variations during circumferential rotation.

According to a preferred embodiment, the teeth are secured to the journals for rotation therewith and the journals are pivotably borne in cylindrical bores of the central wheels, the bores being parallel to the gear axis. This arrangement permits easy manufacture as the teeth and the journals can be separately produced in advance and can be connected to each other afterwards so that finally all that is necessary is to insert the journals and the teeth into the bores of the central wheel.

Preferably the teeth are integral with the respective journals, the tooth profiles advantageously being made by bevelling the lateral faces of a cylindrical bolt. This insures cost-saving production that permits high accuracy even with large quantities, the more so since the tooth flanks feature the necessary parallel alignment to the axes of the journals without extra precautions.

In another preferred embodiment the journals are attached to the central wheels for rotation therewith and the journals extend into cylindrical bores of the teeth for the pivotable arrangement of the teeth, the bores being parallel to the gear axis. This embodiment, too, readily permits manufacture and assembly, with the journals being inserted into corresponding bores or recesses of the central wheel first and the teeth being pushed onto the journals then. Both the aforementioned embodiments are distinguished in that the bores can be readily and precisely provided in the central wheel and/or in the teeth. Moreover, the cylindrical faces required of the journals can easily be provided for, and the necessary tolerances for fitting can be insured even for large batch quantities.

In particular, the teeth comprise cylindrical outer faces of rotational symmetry, the outer faces being borne in hollow cylindrical bearing faces of the central wheels. In this very advantageous way the teeth find direct support in the central wheels, and bending moments are largely withheld from the journals.

In a planetary gear according to the prior art, it is possible to have the planet wheel teeth engage in virtual tooth gaps, across almost the entire circumference. This results in very large contact surfaces, and the gear which is capable of transmitting considerable torques can be made to smaller dimensions than before. Now it has proven to be economically reasonable to have the planet wheel teeth engage in virtual tooth gaps only across 30 to 40 percent of the circumference. Those pivotable teeth that close virtual tooth gaps not in mesh with planet wheel teeth are not controlled then so that they can pivot erratically. This reduces the risk that these uncontrolled pivotable teeth may assume a wrong position when becoming reengaged to the planet wheel teeth and may thus cause malfunctions. In order to prevent this, the invention further provides for spring means expediently associated with each tooth so as to force it back into its normal position, viz. in symmetry to an axial plane passing through the gear axis.

According to yet another embodiment, these spring means consist of pull-back spring bars, one end of which are attached to the central wheels while the other ends extend into substantially radial bores of the journals. In a particularly simple design, the substantially radial bores are provided on ends of the journals and bent tips of the spring bars extend into central wheel bores which preferably are substantially parallel to the gear axis.

In the design described, the spring bars project from the ends of the journals. If this is to be avoided, the journals and/or the cylindrical bores may, according to another embodiment, be provided with a centrally arranged annular groove in the zone of which there are substantially radial bores in the journals, on the one hand, and in the central wheels or in the teeth thereof, on the other hand for receiving the spring bar ends. This annular groove will prevent shearing during the pivoting motion of the journals.

In order that the pivotable teeth of the central wheels may not be turned off by the meshing planet wheel teeth, yet other embodiments of the invention provide that the axes of the journals or of said teeth are arranged such that the line of applied force of two engaged teeth of said planet and central wheels either coincides with the line of projection of the axes onto the common contact zone or is at the side remote from the tops of the respective teeth. Without complicating the design, safe power transmission between the central and planet wheels is thus guaranteed.

Further features and advantages of the planetary gear according to the invention are disclosed and elucidated hereinafter with reference to the drawings.

BRIEF DESCRIPTION OF THE DRAWINGS

In the drawings

FIG. 3 is an enlarged side view of the planet wheel tooth and of two pivotable teeth;

DESCRIPTION OF THE PREFERRED EMBODIMENTS

Figure 1:
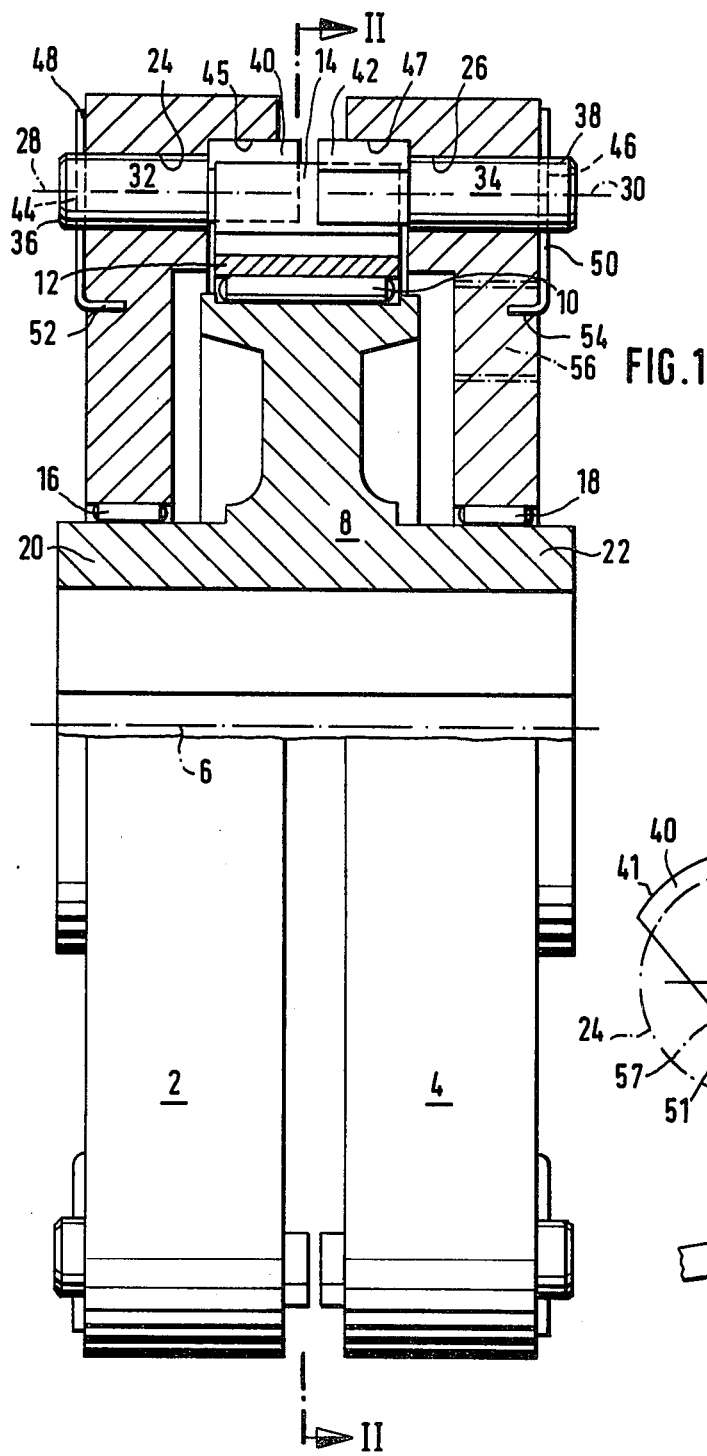
FIG. 1 is an axial cross section (on top) and a side elevation (below) of a planetary gear according to the invention.

Referring to the drawings, in particular FIG. 1 shows an embodiment of the planetary gear according to the invention, having a lefthand central wheel or orbit gear 2 and a righthand central wheel or orbit gear 4 which are adjacent each other along a gear axis 6. A rotary disk 8, which carries a planet wheel 12 by way of a roller bearing 10, is arranged between the two central wheels 2, 4. At the radial outside, the planet wheel 12 comprises a number of teeth 14 of which only one is to be seen in FIG. 1 as a side elevation. By means of roller bearings 16 and 18, respectively, the central wheels 2 and 4 are borne for rotation on axles 20 and 22, respectively.

At the radial outside, each of the central wheels 2 and 4 is provided with cylindrical bores 24 and 26, respectively, whose axes 28 and 30, respectively, are substantially parallel to the gear axis 6. In these bores, are journals 32 and 34, respectively, the opposite ends 36 and 38 of which slightly project from the respective central wheel 2 and 4. The other ends of the journals 32 and 34 are provided with teeth 40 and 42, respectively, which are secured thereto for rotation with these journals which are pivotable in the bores 24 and 26 around the axes 28 and 30, respectively.

In the direction of gear axis 6, the teeth 14 of planet wheel 12 are so wide that they contact both one flank of a tooth 40 of the lefthand central wheel 2 and one flank of a tooth 42 of the righthand central wheel 4, unless they are opposite to them when out of mesh. The ends 36 and 38, respectively, of the journals 32 and 34 have transversal bores 44 and 46, respectively, through which spring bars 48 and 50 extend, whose bent tips 52 and 54, respectively, extend into substantially axial bores of the two central wheels 2 and 4. The spring bars 48 and 50, respectively, serve to hold those teeth 40 and 42 of central wheels 2 and 4 which are out of mesh with the teeth 14 of planet wheel 12, in a normal position, permitting pivoting of the journals 32 and 34 and thus also of the teeth 40 and 42, respectively, by about 1 to 2 degrees.

In said normal position, the tooth tops 51 point in a radial direction to the gear axis 6. The spring bars 48 and 50 thus insure that the pivotable teeth 40 and 42 can be reengaged to the planet wheel teeth 14.

The teeth 40 and 42 are, in particular, integral with the journals 32 and 34, respectively, such that the tooth flanks or profiles can be expediently made by bevelling the lateral faces of cylindrical bolts. In order to achieve the design shown of the journals 32 and 34 and of the teeth 40 and 42, respectively, such cylindrical bolts have at first a larger diameter in the zone destined to become the respective teeth than in the region destined to become the journals. Consequently, the teeth 40 and 42 comprise cylindrical outer faces 41 and 43, respectively, which-as is seen in FIG. 3-are rotationally symmetrical to the axes 28 and 30, respectively, and extend across a predetermined circumferential portion of the teeth. By the outer faces 41 and 43, the teeth 40 and 42, respectively, are supported in hollow cylindrical bearing faces 45 and 47 of the central wheels 2 and 4, respectively, so as to largely withhold bending of flexural moments from the journals 32 and 34.

FIG. 1 also indicates, by dash-dot lines, a bore 56 in the righthand central wheel 4 which contains several such bores, e.g. for providing screw or bolt connections to a driving device member (not shown).

Figure 2:
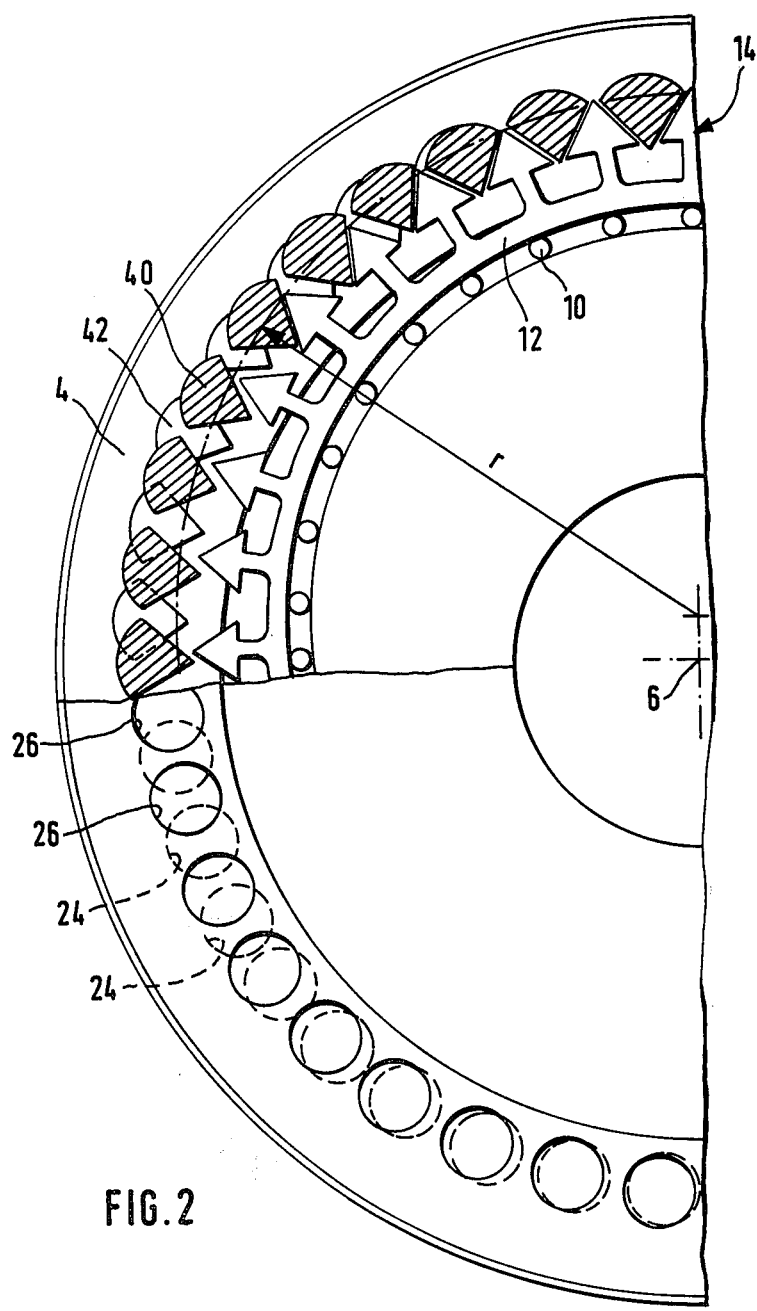
FIG. 2 is a basic presentation of a radial cross section along the line II—II in FIG. 1.

From the basic radial cross section shown in FIG. 2, the teeth 40 of the lefthand central wheel 2 can be seen; for the sake of lucidity, the associated journals are not shown there. The teeth 42 of the righthand central wheel 4, which teeth are behind the teeth 40 in the viewing direction, will also be seen. As the tooth rows of the two central wheels 2 and 4 have different pitches, the difference in the number of teeth being equal to two (2), virtual tooth gaps result in a manner known per se. The radius of the virtual pitch circle is designated by $r_{virt}$. Into these virtual tooth gaps extend the teeth 14 of planet wheel 12 which is supported, as mentioned above, on the rotary disk 8 by the roller bearing 10.

In the lower half of FIG. 2, the teeth 40 and 42 have been omitted but the cylindrical bores 26 of the righthand central wheel 4 are shown. Likewise, the cylindrical bores 24 are indicated for the sake of a better comprehension of the invention (although these bores 24 really are in front of the radial section plane and, therefore, would not be seen in principle). The displacement of the bores 24 and 26 in a circumferential direction is due to the different number of teeth of the two central wheels 2 and 4, respectively.

An enlarged view of a tooth 14 of the planet wheel 12 and of two teeth 40 and 42 is shown in FIG. 3 which also indicates the bore 24 in which the journal (32) of the tooth 40 is pivotable around axis 28. By means of journal 34, the tooth 42 is pivotable around axis 30. A slender web 58 connects the tooth 14 to planet wheel 12 so as to permit slight pivoting of the tooth for balancing the pitch variation of the virtual tooth gaps across the circumference. In the embodiment shown, the teeth 40 and 42 of both central wheels 2 and 4, respectively, are designed to be pivotable so that the teeth 14 of planet wheel 12 need not really be also pivotable. In fact, it would do to arrange for circumferential displacement of the planet wheel teeth as known per se from U.S. Pat. No. 4,099,427.

The common contact zone 55 of two meshing teeth 40 and 14 of the central and planet wheels 2 and 12, respectively, is evident in FIG. 3. This contact zone 55 extends between the tops of these teeth. For the sake of lucidity, a line of applied force 57 is shown somewhat closer to the tooth top 51 of tooth 40 although the line of applied force 57 will on the average be about at the center between the tops of the teeth 40 and 14 represented. A line of projection 59 of axis 28 is shown at the contact zone 55. If the spacing or distance "e" between said lines 57 and 59 is positive as indicated in FIG. 3, a torque will act on tooth 40 tending to rotate it clockwise. Such torque can advantageously be counteracted by spring means explained below. However, axis 28 can be arranged such that the distance "e" between lines 57 and 59 equals zero or is below zero. In this case, the line of applied force 57 coincides with the line of projection 59 or it is (contrary to FIG. 3) relative thereto on the side remote from tooth top 51 of tooth 40 of the lefthand central wheel 2.

In another embodiment (not shown), the teeth of but one central wheel are arranged for pivoting whereas the teeth of the other central wheel are rigidly secured thereto. In this case, the planet wheel teeth must be pivotable, in particular in accordance with FIG. 2, as the three teeth mentioned can positively engage face to face despite the flank angles of the virtual tooth gaps continuously varying across the gear circumference only if at least two of the teeth are pivotable.

Figure 4:
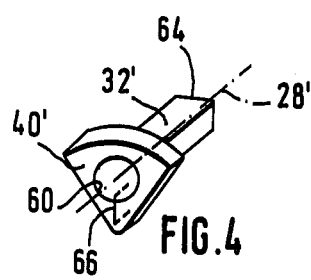
FIG. 4 is an oblique view of pivotable tooth.

An oblique view of a pivotable tooth 40' and journal 32' is seen in FIG. 4. The tooth 40' shown there is of substantially triangular cross section and contains a cylindrical bore 60 into which one end of the journal 32' extends. By contrast to the embodiments described above, such tooth 40' is pivotable around the journal 32' whose other end 64 (at the right in FIG. 4) is of square or rectangular cross section so as to permit reception in a matching groove of the central wheel 2' for rotation therewith. For push-back of the tooth into its normal position, a spring bar 66 is provided which has bent ends, one of which extends into a bore of tooth 40' while the other end extends into a bore of journal 32', the latter bore being expediently at a large distance to the axis of rotation 28'.

Figure 5:
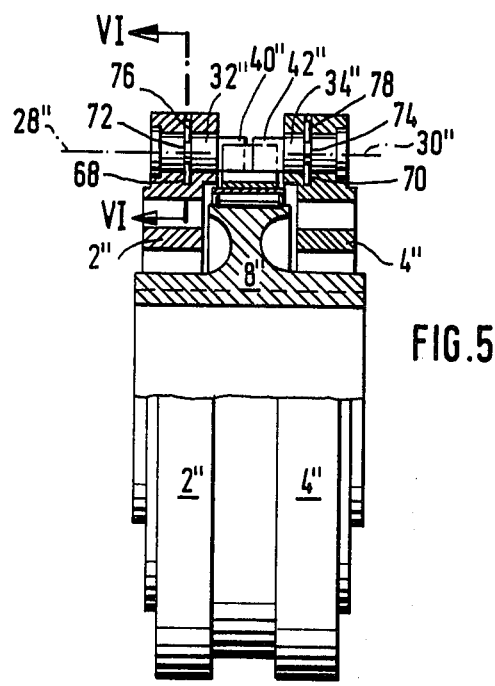
FIG. 5 is an axial cross section (on top) and a side elevation (below) of a further embodiment of the invention.

Another preferred embodiment of the planetary gear of the invention will be evident from FIG. 5 the design and function of which largely correspond to the embodiment of FIG. 1. Like elements, therefore, are designated by the same reference numerals with a double prime. Here, the teeth 40" and 42" are secured to the journals 32" and 34", respectively, for rotation therewith. These journals, in turn, are pivotable around the axes 28" and 30", respectively, in the central wheels 2" and 4". At about the centers of the journals 32" and 34", each of these comprises an annular groove 68 and 70, respectively, with a transversal bore 72 and 74 through which a spring bar 76 and 78, respectively, extends.

Figure 6:
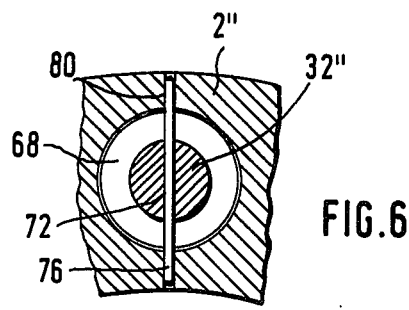
FIG. 6 is an enlarged cross section along the line VI—VI in FIG. 5.

It will be seen from FIG. 6 that the ends of spring bar 76 are situated in a bore 80 of central wheel 2". In like manner, spring bar 78 is arranged in central wheel 4". Thus the teeth 40" and 42" are biased to their normal positions for the reasons stated above. The annular grooves 68 and 70 serve to provide sufficient spring excursion and to prevent shearing of the spring bars 76 and 78, respectively, during the pivoting motion of the journals 32" and 34" and/or of teeth 40" and 42", respectively.

While preferred embodiments have been illustrated and elucidated hereinabove, it should be understood that numerous variations and modifications will be apparent to one skilled in the art without departing from the principles of the invention which, therefore, is not to be construed as being limited to the specific forms described.

I claim:

1. In a planetary gear having two adjacent identical central wheels with teeth of different pitch and a planet wheel whose pitch is equal to that of a virtual tooth row formed by the central wheel teeth and whose teeth extend into tooth gaps in the virtual tooth row, the planet wheel being arranged fro guided slaving by a rotary disk, at least two of said three mentioned wheels having pivotable teeth, the teeth of both the central wheels and the planet wheel being of substantially triangular cross section with plane tooth profiles, the improvement wherein the pivotable teeth of at least one of said central wheels are arranged on journals.

2. Planetary gear according to claim 1, wherein the teeth of both central wheels are arranged on journals.

3. Planetary gear according to claim 1, including a gear axis and wherein said teeth are secured to said journals for rotation therewith and wherein said journals are pivotably borne in cylindrical bores of said central wheels, said bores being parallel to the gear axis.

4. Planetary gear according to claim 3, wherein said teeth are integral with the respective journals, the tooth profiles being made by bevelling the lateral faces of a cylindrical bolt.

5. Planetary gear according to claim 1, including a gear axis and wherein said journals are attached to said central wheels for rotation therewith and wherein said journals extend into cylindrical bores of said teeth for the pivotable arrangement of said teeth, said bores being parallel to the gear axis.

6. Planetary gear according to claim 1, wherein said teeth comprise cylindrical outer faces of rotational symmetry, said outer faces being borne in hollow cylindrical bearing faces of said central wheels.

7. Planetary gear according to claim 1, including a gear axis and wherein spring means are associated with each tooth so as to impose on it a normal position in which its plane of symmetry coincides at least approximately with an axial plane passing through the gear axis.

8. Planetary gear according to claim 7, wherein said spring means comprise spring bars, the one end of each attached to said central wheels while the other end of each extends into substantially radial bores of said journals.

9. Planetary gear according to claim 8, wherein said substantially radial bores are provided on ends of said journals projecting from said central wheels into which bent tips of said spring bars extend.

10. Planetary gear according to claim 8, wherein at least one of said journals and said cylindrical bores are provided with a centrally arranged annular groove in the zone of which there are substantially radial bores in said journals on the one hand and in said central wheels or in the teeth thereof on the other hand for receiving said ends of said spring bars, said radial bores being aligned to each other in the respective normal position.

11. Planetary gear according to claim 1 or claim 8, wherein axes of said journals or of said teeth are arranged such that the line of applied force of two engaged teeth of said planet and central wheels is at the side remote to the tops of respective teeth.

12. Planetary gear according to claim 1 or claim 8, wherein axes of said journals or of said teeth are arranged such that a line of applied force of two engaged teeth of said planet and central wheels, which are engaged at a common contact zone, coincides with a line of projection of said axes onto the common contact zone.

13. A planetary gear comprising, a first orbit gear having a plurality of triangular teeth each pivotally mounted by a journal to said first orbit gear;

a second orbit gear having a plurality of triangular teeth in a number different from said plurality of teeth of said first orbit gear;

said first and second orbit gears mounted for juxtaposed rotation so that said two pluralities of teeth form a virtual row of teeth therebetween; and a planet wheel having a further plurality of teeth in a number equal to teeth of said virtual row, meshed between gaps in said virtual row.

14. A planetary gear according to claim 13, including a spring connected between said first orbit gear and each of its pivotally mounted plurality of triangular teeth to bias each triangular tooth toward a neutral position.

* * * * *